United States Patent [19]
Martineau

[11] Patent Number: 6,045,231
[45] Date of Patent: Apr. 4, 2000

[54] OPEN CORE LIGHT-WEIGHT TELESCOPE MIRROR AND METHOD OF MANUFACTURE

[76] Inventor: Phillip R. Martineau, 3182 S. Teton Dr., Salt Lake City, Utah 84109

[21] Appl. No.: 09/370,943

[22] Filed: Aug. 9, 1999

[51] Int. Cl.⁷ ..................................... G02B 5/08
[52] U.S. Cl. .......................... 359/838; 359/840; 359/846; 359/847; 359/848; 359/849
[58] Field of Search .................. 359/838, 840, 359/848, 883, 846, 847, 849, 850

[56] References Cited

U.S. PATENT DOCUMENTS

| | | | |
|---|---|---|---|
| 2,988,959 | 6/1961 | Pelkey | 88/105 |
| 3,484,327 | 12/1969 | Denman | 161/1 |
| 3,484,328 | 12/1969 | Austin | 161/4 |
| 3,507,737 | 4/1970 | Busdiecker | 161/4 |
| 3,644,022 | 2/1972 | Jagdi | 350/310 |
| 3,728,186 | 4/1973 | Mohn | 156/153 |
| 3,754,812 | 8/1973 | Mohn | 350/167 |
| 4,331,383 | 5/1982 | Christiansen | 350/310 |
| 4,447,130 | 5/1984 | Christiansen | 350/310 |
| 4,466,700 | 8/1984 | Christiansen | 350/310 |
| 4,678,293 | 7/1987 | Jacques | 350/609 |
| 4,898,604 | 2/1990 | Sauerwein . | |
| 4,917,934 | 4/1990 | Sempolinski | 428/116 |
| 5,076,700 | 12/1991 | DeCaprio | 359/848 |
| 5,227,921 | 7/1993 | Bleier | 359/848 |
| 5,741,443 | 4/1998 | Taylor | 264/1.21 |
| 5,956,191 | 9/1999 | Blackmon et al. | 359/846 |

*Primary Examiner*—Cassandra Spyrou
*Assistant Examiner*—Mohammad Y. Sikder

[57] ABSTRACT

A Light-weight low cost mirror for astronomical purposes and a method of manufacturing said light-weight mirror is disclosed. The light-weight mirror is comprised of an optical plate a backing plate and a core disposed between said optical plate and said backing plate. The core is comprised of a plurality of core strips. Said core strips are assembled in an arrangement wherein the core strips, the optical plate and the backing plate form cavities by the intersection of the core strips with the backing and the optical plate. The cavities are open the outside diameter edge of the mirror. A method is also disclosed for manufacturing the mirror by fusing the core to opposing faces of the optical plate and backing plate. Melt support assemblies are used to support the unfused backing plate and core strips. The unfused assembly is heated to the glass melting temperature to fuse the core to the optical plate and backing plate. After cooling to room temperature the core support assemblies are removed from the mirror blank. The mirror reflective surface is then manufactured using conventional telescope mirror reflective surfaces manufacturing methods.

11 Claims, 8 Drawing Sheets

OPEN CORE LIGHT-WEIGHT TELESCOPE MIRROR AND METHOD OF MANUFACTURE

BACKGOUND

1. Field of Invention

This invention relates to a design of a low-cost, light-weight telescope mirror blank and a manufacturing method for said low-cost, light-weight telescope mirror blank.

2. Description of Prior Art

Telescope mirrors are constructed to provide high structural rigidity. This rigidity is required to resist deformation from gravitational loads. Deformation changes the shape of the mirror, and as a result, degrades the reflected images. Conventional mirrors achieve high rigidity by constructing the mirrors of thick solid glass disks. Typical glass thickness ranges from one tenth to one sixth the mirror diameter. As a result, conventional mirrors are heavy and have high material cost. In addition, the thickness requires expensive annealing steps to eliminate internal stresses and prevent crystallization of the glass.

Light-weight telescope mirrors typically have an optical plate, a core, and backing plate The outer structural plates are the optical plate and the backing plate and are separated by a core. Quartz glass, fused quartz, or high-silica glass are typical materials used for the core, optical plate, and backing plate. Resistance to deformation (rigidity) increases as the distance between the outer plates increases. Prior art core and plate mirror designs are constructed in two or three manufacturing steps. First, a core is constructed. The optical plate and backing plate are then fixedly attached by bonding or fusing to the core. Manufacturing costs increase as the number of processing steps increase. In addition, each manufacturing step adds product damage risk. Representative of the prior art are U.S. Pat. No. 5,076,700 to DeCaprio and U.S. Pat. No. 4,447,130 to Christiansen.

A core is, conventionally, a honeycomb, closed cell, type structure. A honeycomb core is fabricated by hand-welding individual ribs or from short sections of tubing. These manufacturing methods are expensive and present significant risk of damaging the core during the manufacturing process. Welding must be performed at or near the glass annealing temperature to prevent introduction of internal welding stresses. High temperature welding requires expensive specialized tooling and labor intensive procedures.

DeCaprio discloses a method for bonding the optical plate to the core using glass frit. This frit melts at a lower temperature than the material of the core and plates. In addition, the thermal expansion of the frit must be substantially the same as the thermal expansion of the optical plate, backing plate, and core. Unequal thermal expansion could result in mirror deformation with temperature changes. The bonded components are required to be machined to accurate dimensions to assure uniform bond thickness. Bonding surfaces must also be cleaned. Uniform bond thickness and clean bonding surfaces are required to assure adequate bond strength, Uniform bond thickness is also required to minimize the affects of any differences in glass and adhesive thermal expansion. Vent holes must also be provided to allow pressure equalization between the closed cells and ambient pressure. Unequal pressure could deform the optical plate and degrade the reflected images. In addition, unequal pressure in the closed cells could load, and possibly damage, the core to plate bonds. Providing pressure equalization holes adds cost and manufacturing risk to the mirror.

Mohn, U.S. Pat. No. 3,754,812 discloses a method of fusing the optical plate the and backing plate to the core. Fusing is achieved by high intensity radiant heat from a high temperature carbon arc. The glass must reach the fusing temperature. At this temperature, the optical plate, backing plate, and core are susceptible to sagging and require support. Closed cell core designs do not allow for an easy means of installing supports and removing these supports after fusing the optical plate and the backing plate to the core. In the prior art, removal of these supports requires the presents of holes in the backing plate, as described by Christiansen, U.S. Pat. No. 4,331,383. The supports are removed through these holes. Supports are removed by disassembly or breaking up the supports. Disassembleable supports are expensive and would require regular replacement of damaged supports. In the case where the supports are broken up, the new supports would be required for each mirror. In addition, the breakable supports present a significant risk of damage to the mirror during breakup and removal of the supports.

OBJECTS AND ADVANTAGES

In accordance with the invention, an improved light-weight telescope mirror blank design is provided and method of constructing said light-weight telescope mirror blank is provided. Said light-weight telescope mirror blank of the invention is comprised of an optical plate, a core, and a backing plate. The optical plate and the backing plate are constructed of commercially available plate glass. The core is constructed of a plurality of members also manufactured from plate glass. Design of the core includes cavities which are open to the outside diameter edge of the mirror blank. The core is placed between, and joined by fusing to, opposing faces of the optical plate and backing plate. Core members are held in position prior to and during fusing of the backing plate and the optical plate by a plurality of melt support assemblies. The melt support assemblies are removed from the mirror through the cavity openings on the outside diameter edge of the mirror.

Accordingly, it is an objective of the invention to provide an improved light-weight low cost telescope mirror design.

Still a further object of the invention is to provide a light-weight mirror design having an optical plate, a core, and a backing plate.

Yet another object of the invention is to provide a means of assembling and supporting a core, a backing plate, and an optical plate during fusing of the core to opposing faces of the optical plate and backing plate using melt support assemblies.

Yet another objective of the invention is to provide a means to fuse the optical plate, backing plate and core into a rigid structure in a single heating cycle Still another object of the invention is to provide a core design, with cavity openings at the outside diameter edge of the light-weight mirror blank, which allows easy removal of melt support assemblies.

Other objects of the invention will in part be obvious and will in part be apparent from the following description. The invention accordingly comprises an assembly possessing the features, properties and the relation of components which will be exemplified in the products hereinafter described and the method of constructing the products hereinafter described, and the scope of the invention will be indicated in the claims.

Reference Numerals

| | |
|---|---|
| 10 optical plate | 20 backing plate |
| 30 core | 32 center core strip |
| 33 center core strip notch | 34 first diagonal core strip |
| 36 second diagonal core strip | 38 open cell core cavity |
| 40 base plate | 42 base plate mold surface |
| 44 base plate vent grooves | 52 center melt support assembly |
| 54 first melt support assembly | 56 second melt support assembly |
| 57 center backing plate support | 58 first backing plate support |
| 59 second backing plate support | 60 spacer |
| 70 ceramic fiber felt | 80 top plate |

SUMMARY

In accordance with the present invention, a light-weight mirror design especially for telescopes is provided comprising an optical plate, a backing plate, and a core wherein said core, comprised of a plurality of core strips, is disposed between said optical plate and said backing plate. Cavities are formed by the core strips intersecting the optical plate and the backing plate. These cavities extend from the interior of the mirror to the outside diameter edge of the mirror. The cavities form cavity openings where the cavities intersect the outside diameter edge of the light-weight mirror.

Also, the present invention provides method for making a light-weight mirror blank wherein an optical plate is assembled on a base plate. A plurality of melt support assemblies is disposed in a predetermined pattern on top of said optical plate. A plurality of core strips is sandwiched between said melt support assemblies. A backing plate is then placed on top of said melt support assemblies and core strips. A top plate is then placed on top of said backing plate. This completes a pre-melt assembly. This assembly is then fused into a single structure by heating the assembly to the glass fusing temperature. The fused light-weight mirror blank is cooled to the glass annealing temperature and held at the annealing temperature for sufficient time to eliminate cool down stresses in the glass. Following cool down to room temperature, the core supports are removed from the fused mirror blank through the cavity openings.

Preferred Embodiment-Description

Figure 1:
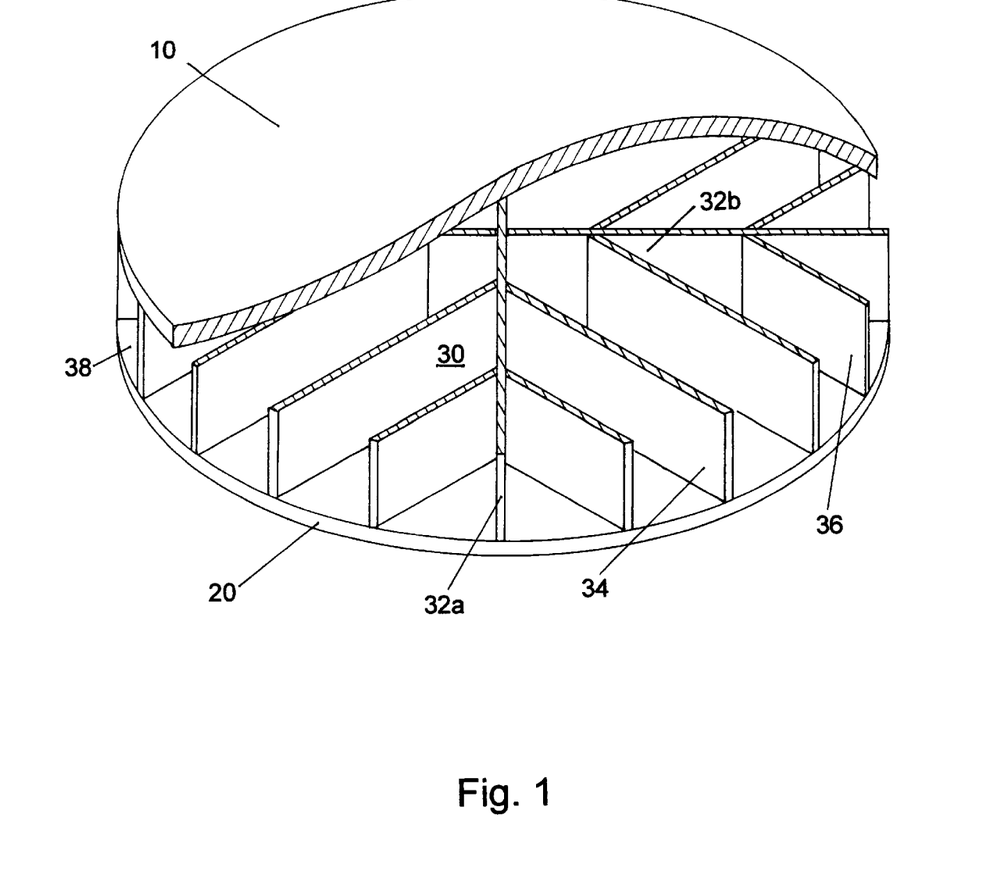
FIG. 1 is a perspective view of a light-weight mirror of the invention.

FIG. 1 shows a perspective view of a light-weight mirror having an optical plate 10, a backing plate 20, and a core 30.

Quartz glass, fused quartz, or high silica glass are materials used for optical plate 10, backing plate 20, and core 30. Optical plate 10 can have a convex, a plainer, or a concave contour. Core 30 is constructed of two center core strips 32a and 32b, and a plurality of first diagonal core strips 34, and a plurality of second diagonal core strips 36. A plurality of cavities 38 is formed by the intersection of core 30 with optical plate 10, and backing plate 20.

Each quadrant is formed by two intersecting center core strips 32a and 32b. In each quadrant are two first diagonal core strips 34, and two second diagonal core strips 36.

The number of diagonal core strips can be more or less than show here and is dependent on the size of the mirror and the core strips spacing. Center core strips 32a and 32b, and diagonal core strips, 34 and 36, are assembled substantially perpendicular to the surfaces of the optical plate and backing plate, parallel to the axis of the mirror.

Core 30 components are joined by fusing the contiguous components together. Core 30 is assembled and fused between optical plate 10 and backing plate 20 in a single heating cycle. Fusing is preferred over bonding because fusing eliminates the need to machine center core strips 32a and 32b, and diagonal core strips 34 and 36 to exact pre-melt dimensions. Fusing allows the glass to flow. Flow allows the abutted components to conform and fuse into direct contact with each other.

As shown in FIG. 1, core 30 is constructed so that cavities 38 are formed by the intersection of optical plate 10, and backing plate 20, with core 30. These cavities are opened to the outside diameter edge of the core supported mirror. Cavities can be of square, rectangular, triangular, or any cross section that will accommodate melt support assemblies 52, 54, or 56, and separate optical plate 10 from backing plate 20.

Adjacent core strips 34 and core strips 46 and 36 are slightly closer together at the interior of the light-weight mirror than at the outside diameter edge, creating a draft angle between adjacent core strips 34 and between core strip 34 and core strip 36. This draft angle allows for easy extraction of the melt support assemblies from the fused light-weight mirror blank.

Figure 2:
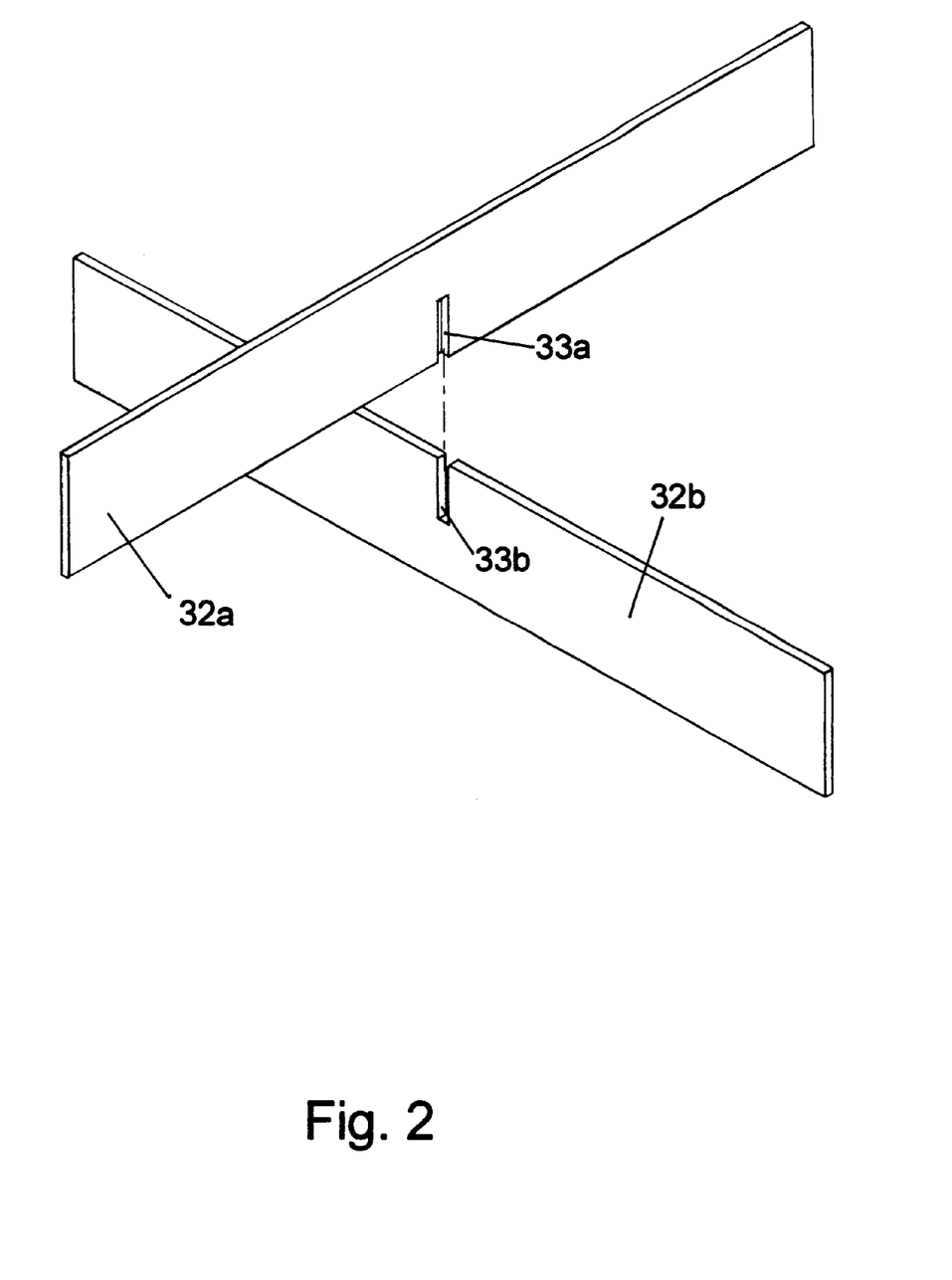
FIG. 2 is a perspective view of two center core strips of the invention.

FIG. 2 shows a perspective view of assembled center core strips 32a and 32b. Each light-weight mirror has two center core strips 32a and 32b and are of identical design. The longitudinal axes of the two center core strips are assembled with said longitudinal axes perpendicular to each other. The length of a center core strip is the same as the diameter of the mirror and a center core strip's width is the same as the height of the core. Notches 33a and 33b are disposed at the mid point along the lengths of each center core strip. Notches 33a and 33b are of sufficient width and depth to allow for insertion of the mating center core strip notches.

Figure 3:
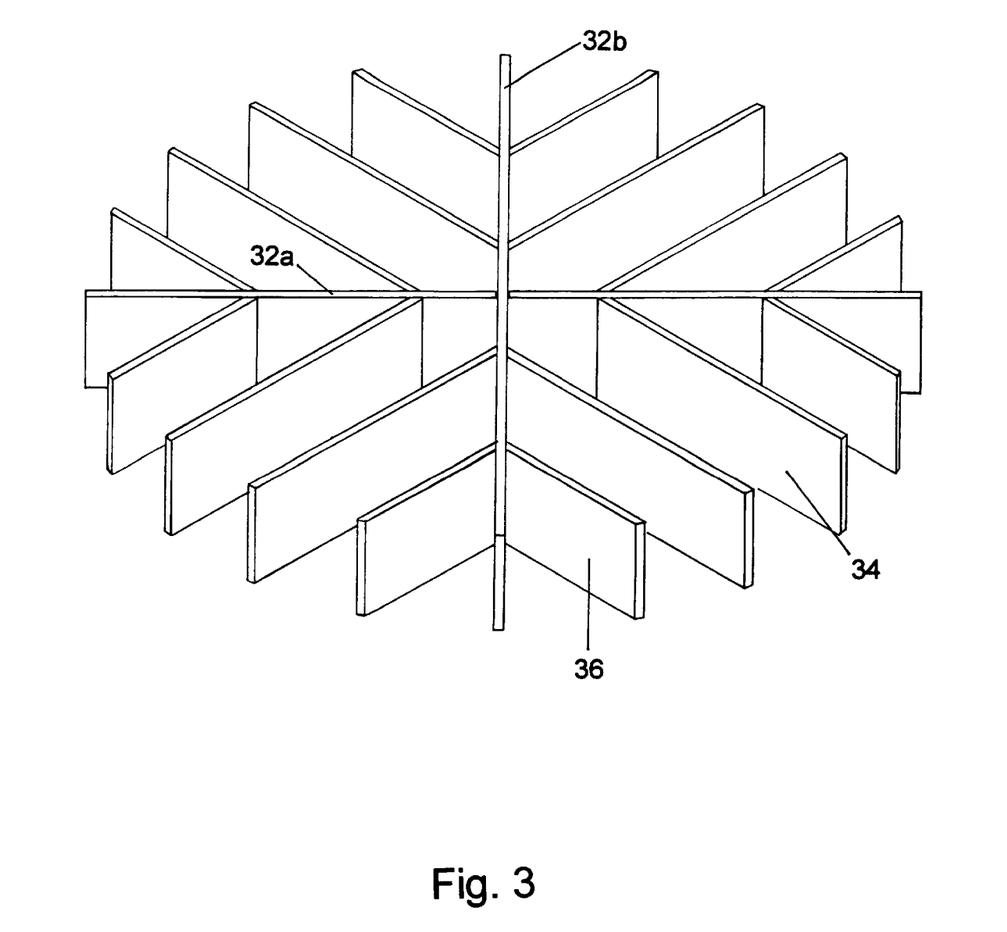
FIG. 3 is a perspective view of a light-weight mirror core of the invention.

FIG. 3 shows a perspective view of a core 30. Lengths of first and second diagonal core strips 34 and 36 are determined by the positions of said diagonal core strips. The strips extend diagonally from a center core strip 32a or 32b to the outside diameter edge of the light-weight mirror. A diagonal core strip's width is the same as the core height.

To manufacture a light-weight mirror in accordance with the present invention, it is first necessary to determine the appropriate specifications (i.e., dimensions) required for the assembly. These specifications include: 1) the surface area of reflective surface and accordingly, 2) the total thickness of the light-weight mirror, 3) the thickness of optical plate 10, 4) the spacing of core strips 32, 34 and 36.

Preferred Embodiment-Operation

Figure 4:
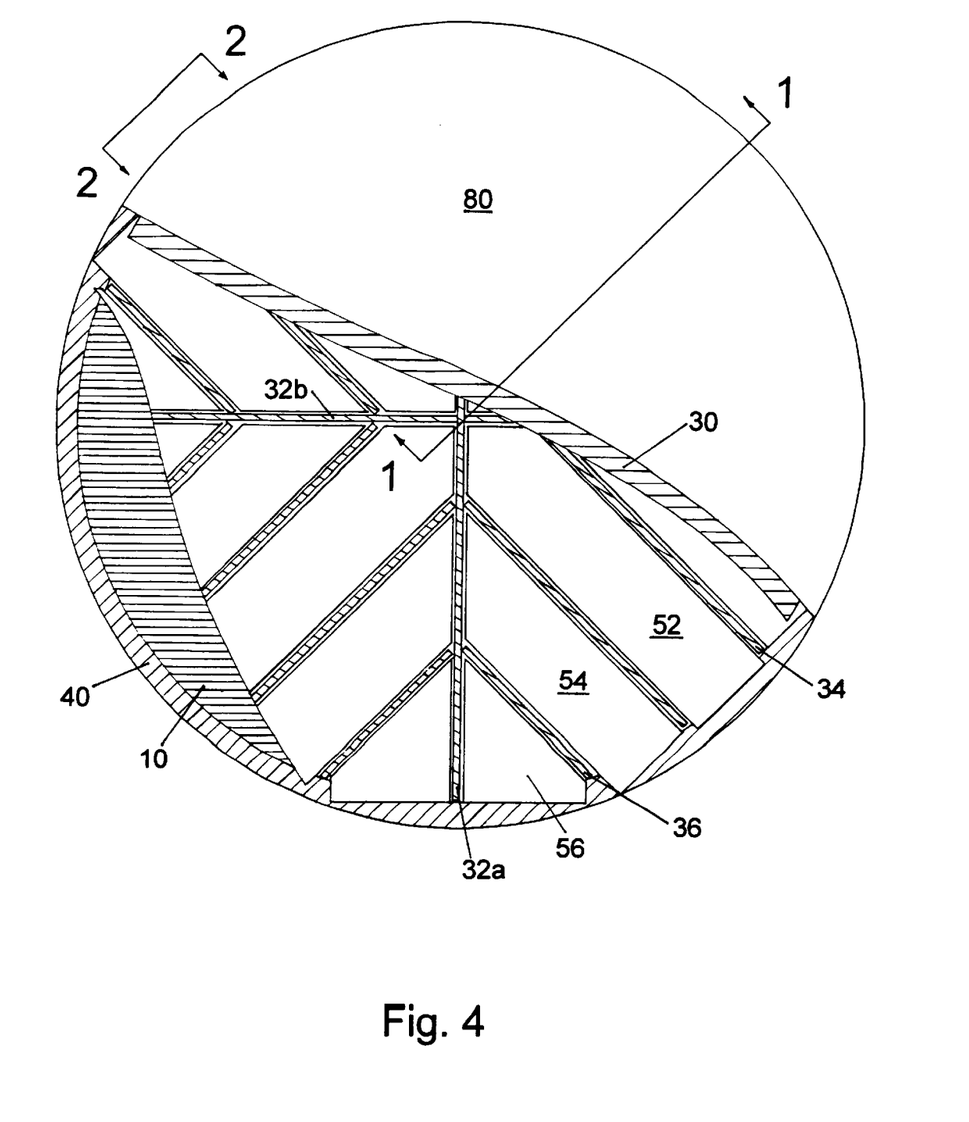
FIG. 4 is a plan of a light-weight mirror blank pre-melt assembly of the invention.
Figure 5:
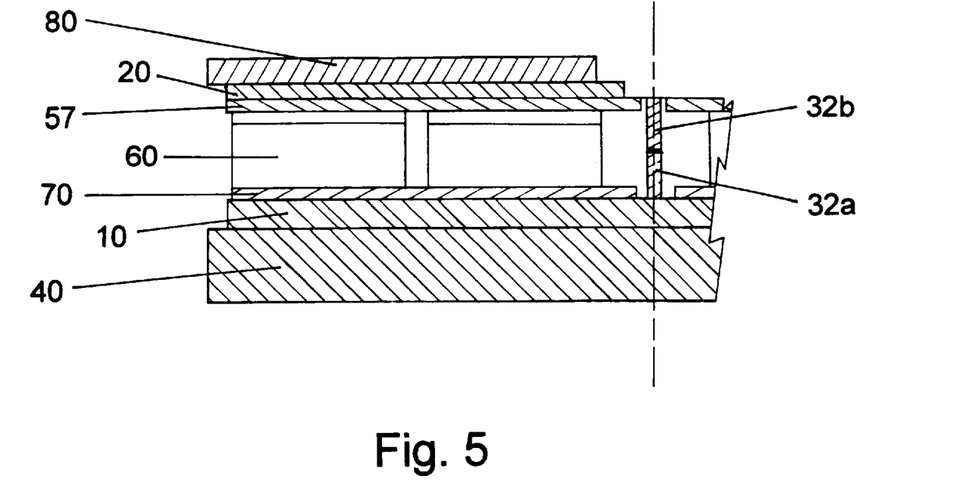
FIG. 5 is a view in detail of the portion indicated by section line A—A in FIG. 4.
Figure 6:
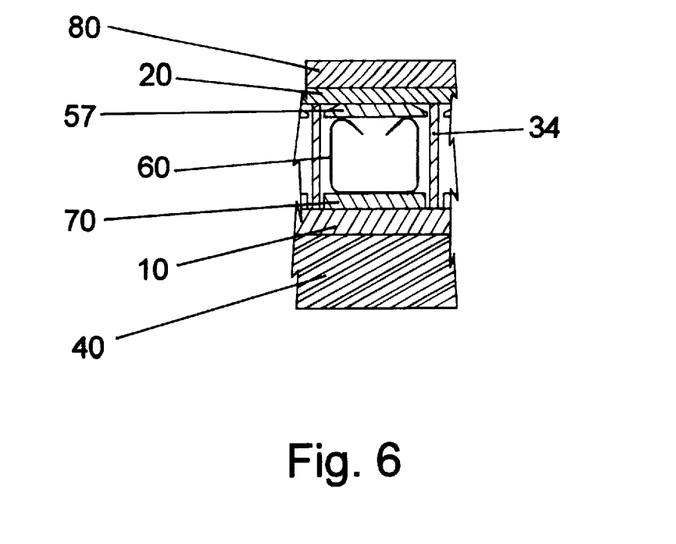
FIG. 6 is a view in detail of the portion indicated by section line B–B in FIG. 4.
Figure 7A:
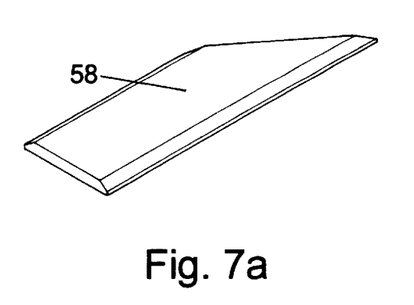
FIG. 7a to 7c shows perspective views of three backing plate supports of the invention.
Figure 7B:
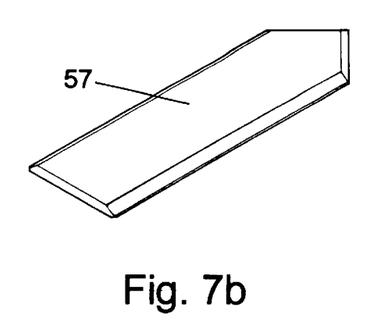
Figure 7C:
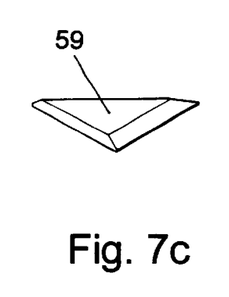
Figure 8:
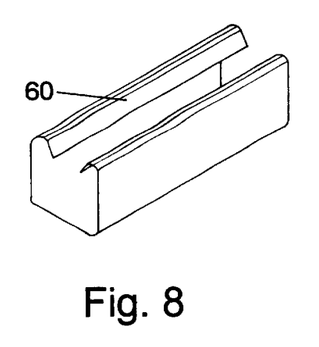
FIG. 8 is a perspective view of a spacer of the invention.

FIG. 4 shows a plan view of a light-weight mirror blank pre-melt assembly, wherein a plurality of melt support assemblies 52, 54, and 56 are depicted therein. A lightweight mirror blank pre-melt assembly is comprised of four 90 azimuthal degree quadrants. Each quadrant has a center melt support assembly 52, two first melt support assemblies 54, and two second melt support assemblies 56. Center-melt support assembly 52 provides spacing and supports two first diagonal core strips 34. First melt support assembly 54 provides spacing and supports first diagonal core strip 34 and second diagonal core strips 36. Second melt support assembly 56 provides spacing and supports a second diagonal core strip 36. FIG. 5 shows section view A—A and FIG. 6 shows section view B—B. Section views A—A and B—B are elevation views of a pre-melt assembly containing a center melt support assembly 52. Melt support assemblies 54 and 56 have the same components as melt support assembly 52. A melt support assembly consists of a ceramic fiber felt strip 70, single or multiple spacers 60, and a backing plate support 57, 58, or 59. FIGS. 7a, 7b, and 7c show perspective views of first, center, and second backing plate supports 57, 58 and 59 respectively. FIG. 8 shows a perspective view of spacer 60. Melt support assemblies 52, 54, and 56 prevent sagging of the backing plate and maintains the positions of center core strips 32a and 32b and diagonal core support strips 34 and 36. A melt support assembly is positioned to maintain each core cavity 38 during heating and fusing of core 30 to optical plate 10 and backing plate 20.

Figure 9:
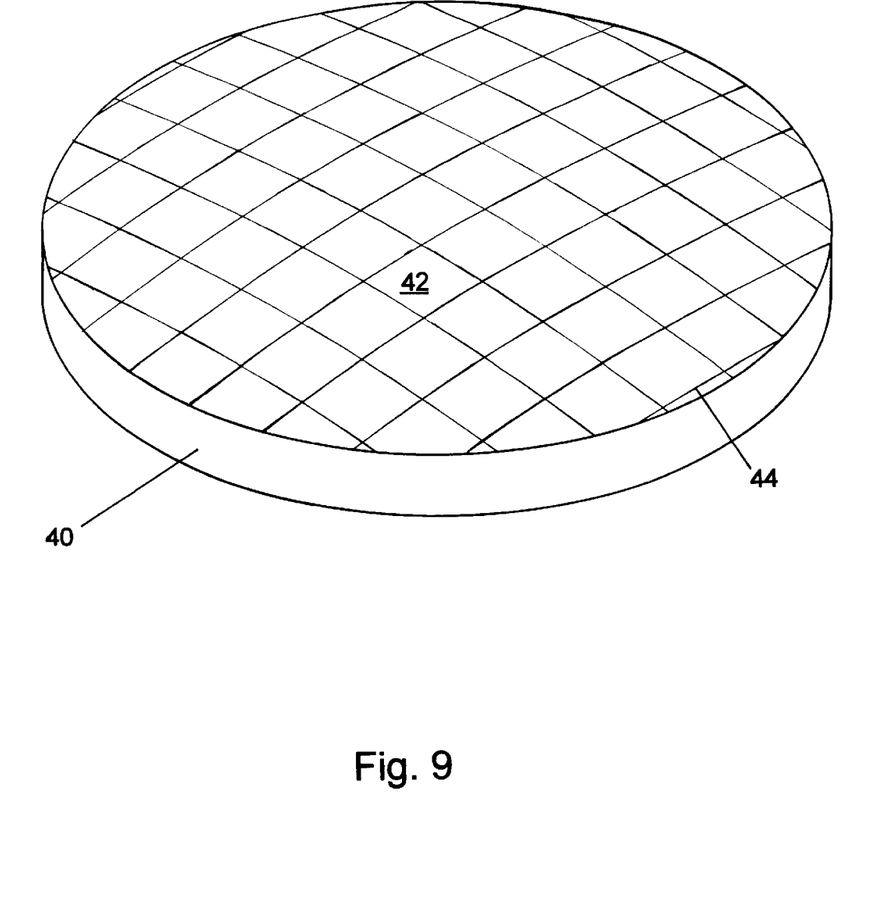
FIG. 9 is a perspective view of a base plate of the invention.
Figure 10A:
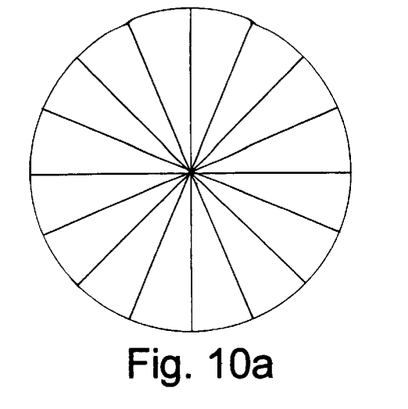
FIG. 10a to 10f are plan views of alternate open core embodiments.
Figure 10B:
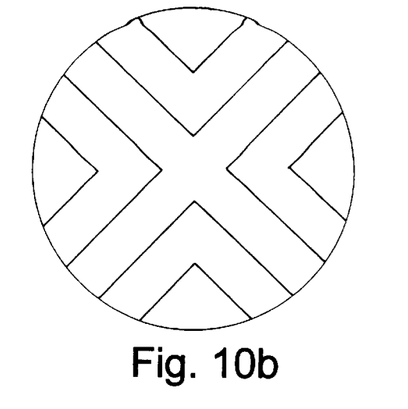
Figure 10C:
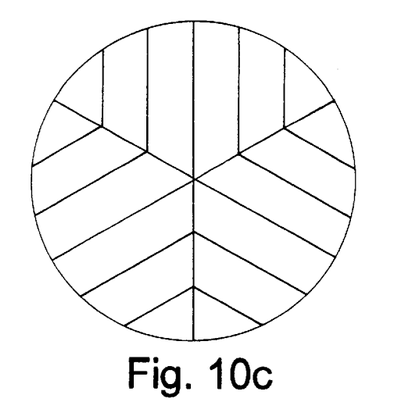
Figure 10D:
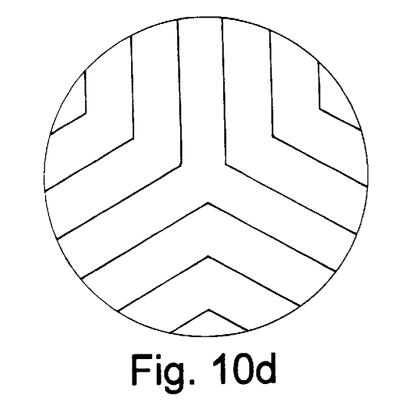
Figure 10E:
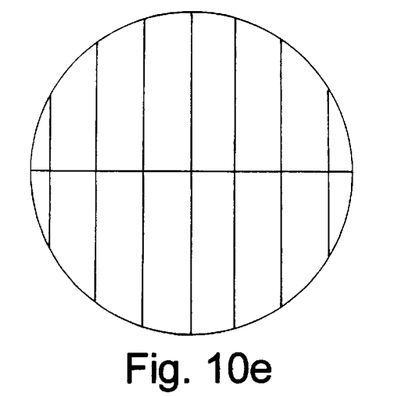
Figure 10F:
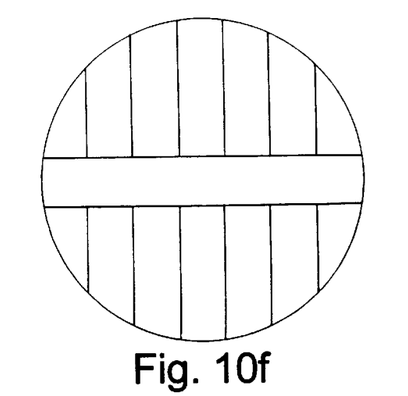

FIG. 9 shows a perspective view of base plate 40. Optical Plate 10 is placed on base plate 40. Two center core strips 32a and 32b are interlocked by inserting opposing center core strip notches 33a and 33b. Interlocked center core strips 32a and 32b are then placed on top of optical plate 10. Melt support assemblies 52, 54, and 56 are then placed on optical plate 10 in the pattern shown in FIG. 4. Diagonal core strips 34 and 36 are then placed in between melt support assemblies 52, 54, and 56. Backing plate 20 is then placed on top of the assembled core and melt supports. Top plate 80 is then place on top of backing plate 20 to complete the pre-melt assembly.

The pre-melt assembly is then placed in a kiln, furnace, oven, or any type of heating device which can heat the assembly to the required temperature. The pre-melt assembly is then heated to the glass softening point (melting temperature) and then cooled. At this point the pre-melt assembly is fused into a complete light-weight mirror blank. During cool down, the fused light-weight mirror blank is cooled to, and held at, the annealing temperature of the glass for sufficient time to substantially relieve the internal cool down stresses in the glass. The light-weight mirror blank is then cooled to room temperature and removed from the kiln. Melt support assemblies 52, 54, and 56 are then disassembled from the light-weight mirror blank. Disassembly is facilitated by the draft angle between the diagonal core support strips. After disassembly, the mirror reflective surface is ground, polished, and reflectively coated using conventional telescope mirror manufacturing techniques.

Ceramic fiber felt 70 prevents spacer 60 from imbedding into the optical plate when the optical plate reaches the softening point. Ceramic fiber felt 70 is required to have a melting temperature greater than the glass fusing temperature. In addition, the ceramic felt must not stick to the glass. Alumina fiber felt has these characteristics and can be used as part of the melt support assemblies. In addition, ceramic fiber felt 70 provides a contribution to the melt support assembly compliance as described below.

Spacers 60 are designed to prevent development of internal stresses in the glass during cool down. This is achieved by designing the spacers to be compliant. This compliance allows melt support assemblies 52, 54, and 56 to deform with the thermal contraction of the light-weight mirror blank during fusion and during initial cool down. Spacers 60 can be constructed of a metal, such as steel, brass, or copper. Spacer materials are not restricted to metals however. Any spacer configuration which provides adequate support, adequate compliance and has a melting temperature greater than that of the glass can be used as a spacer. A stack of ceramic fiber felt of sufficient height could be used in place of a melt support assembly. Melt support assemblies with metal spacers are the preferred embodiment because metal allows for faster cool down and a more uniform temperature distribution in the core supported mirror. In addition, metals spacers are easy to manufacture, can be used multiple times, and as a result, reduce tooling costs.

Backing plate supports 57, 58, and 59 are constructed of ceramic. The ceramic is coated with a material to prevent the supports from sticking to the glass. Kiln wash is an example of this coating. Ceramic is used because its melting temperature is greater than that of the glass. Any material which has a melting temperature greater than the glass and will not stick to the glass can be used for backing plate supports. Ceramic backing plate supports are the preferred embodiment because the supports are easy to manufacture, can be used multiple times, and as a result, reduce tooling cost.

Base plate 40 is also constructed of ceramic. FIG. 9 shows a perspective view of base plate 40. Base plate mold surface 42 can be concave, plainer, or convex. Mold surface 42 is formed by coating base plate 40 with kiln wash to prevent the optical plate from sticking to the base plate. A plurality of base plate vent grooves 44 is disposed on mold surface 42. Vent grooves 44 allow venting of air from between the juxtaposed optical plate 10 and mold plate surface 42.

Top plate 80 is constructed of ceramic. Top plate 80 is a thin disc of ceramic which is substantially the same diameter of the light-weight mirror blank. The purpose of the top plate is to add sufficient weight needed to maintain contact between the backing plate with the core strips. As with the backing plate support and base plate, the top plate must be coated with a material or made of a material which will not stick to the glass Conclusions, Ramifications, and Scope Accordingly, it can be seen that the light-weight mirror blank as described above, provides an improved light-weight low cost telescope mirror design and manufacturing method thereof. In addition, the melt support assemblies provide a method of supporting the pre-melt assembly before and during fusing. Also, the melt support assemblies provide a method of preventing development of residual stresses in the light-weight mirror during cool down. Additionally, the core design provides a means for easy removal of the melt supports following fusing of the mirror blank.

Although the description above contains many specificities, these should not be construed as limiting the scope of the invention but as merely providing illustrations of some of the presently preferred embodiments of this invention. Various other embodiments and ramifications are possible within its scope. For example, design of core 30 can have any embodiment which has cavities opening to the outside diameter edge of the light-weight mirror. Cavities can be of square, rectangular, triangular, circular, elliptical or any cross section that will accommodate melt support assemblies 52, 54, and 56, and separate optical plate 10 from backing plate 20.

Additionally, the core can have alternate open core embodiments. Any open core embodiment where the core cavities extend from the interior of the mirror to the outside diameter edge of the mirror is an alternate embodiment. For example, FIGS. 10a to 10f shows plan views of examples of, but not limited to, alternate open core embodiments.

A melt support assembly can also have embodiments other than that shown above. A melt support assembly embodiment which provides sufficient support and sufficient compliance is an alternate embodiment. For example, a melt support assembly with the backing plate support manufactured from a metal with a melting point greater than the glass is an alternate embodiment. Also, the backing support could be constructed of ceramic fiber felt. Additionally, the metal spacers could be replaced by ceramic fiber felt where the height of the felt would the same as the height of the core.

Thus the scope of the invention should be determined by the appended claims and their legal equivalents, rather than by the examples given.

What is claimed is:

1. A light-weight mirror blank especially for astronomical purposes comprising:

an optical plate of vitreous silica glass, a backing plate of vitreous silica glass and a core comprising of two center core strips, and a plurality of first and second diagonal core strips of vitreous silica glass, wherein said core is fixedly joined by fusing to opposing surfaces of said optical plate and said backing plate and forming a plurality of cavities between said optical plate and said backing plate, wherein said plurality of cavities extend from said light-weight mirror blank's interior to the light-weight mirror blank's outside diameter edge, and are opened to said outside diameter edge.

2. The light-weight mirror blank of claim 1 wherein said optical plate and said backing plate are fixedly joined to said core by bonding with an adhesive.

3. The light-weight mirror blank of claim 1 wherein said plurality of cavities formed by intersections of said core strips with said backing plate and said optical plate form a plurality of azimuthal segments, wherein each said azimuthal segment includes one or more of the cavities wherein each cavity extends from said light-weight mirror blank's interior to said light-weight mirror blank's outside diameter edge and form cavity openings therein.

4. The light-weight mirror blank of claim 1 wherein said plurality of core strips are disposed so that a draft angle is formed wherein the core strips are closer together at said light-weight mirror blank's interior than at said light-weight mirror blank's outside diameter edge.

5. The light-weight mirror blank of claim 1 wherein said plurality of cavities have rectangular cross sections and rectangular openings at said outside diameter edge of said light-weight mirror blank.

6. The light-weight mirror blank of claim 1 wherein said plurality of cavities have triangular cross sections and triangular openings at said outside diameter edge of said light-weight mirror blank.

7. The light-weight mirror blank of claim 1 wherein said plurality of cavities have circular cross sections and circular openings at said outside diameter edge of said light-weight mirror blank.

8. The light-weight mirror blank of claim 1 wherein said plurality of cavities have elliptical cross sections and elliptical openings at said outside diameter edge of said light-weight mirror blank.

9. The light-weight mirror blank of claim 1 wherein said plurality of cavities have polygonal cross sections and polygonal openings at said outside diameter edge of said light-weight mirror blank.

10. The light-weight mirror blank of claim 1 with a predetermined total thickness of said light-weight mirror blank comprising a thickness of said optical plate, a thickness of said backing plate, and a height of said core, wherein said total core thickness provides a means of assuring sufficient structural rigidity to maintain undistorted reflected optical images from the optical plate of the light-weight mirror blank.

11. The light-weight mirror blank of claim 1 wherein a predetermined thickness of said optical plate, with a predetermined spacing of appositioned said core strips, wherein said predetermined spacing and said predetermined thickness of the optical plate provides a means of assuring sufficient structural rigidity to maintain undistorted reflected optical images from the optical plate.

* * * * *